(12) United States Patent  
Branson et al.

(10) Patent No.: US 9,305,077 B2
(45) Date of Patent: *Apr. 5, 2016

(54) MANAGING MULTIPLE WINDOWS ON AN OPERATOR GRAPH

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/057,163

(22) Filed: Oct. 18, 2013

(65) Prior Publication Data

US 2015/0088889 A1 Mar. 26, 2015

Related U.S. Application Data

(63) Continuation of application No. 14/036,581, filed on Sep. 25, 2013.

(51) Int. Cl.
*G06F 17/30* (2006.01)

(52) U.S. Cl.
CPC .... *G06F 17/30598* (2013.01); *G06F 17/30572* (2013.01)

(58) Field of Classification Search
CPC .............. G06F 17/30516; G06F 17/30489; G06F 9/5011; G06F 9/5016; G06F 9/5027; G06F 9/524; G06F 11/00; G06F 11/0715; G06F 11/0793; G06F 17/30; G06F 17/30386; G06F 17/30442; G06F 17/30545; G06F 17/03; G06F 11/362; G06F 11/3636; G06F 17/30587; G06F 17/30598; G06F 17/30286; G06F 17/30289; G06F 8/41; G06F 9/45516; G06F 17/30572; G06F 9/54; G06F 15/163; G06F 3/04

See application file for complete search history.

(56) References Cited

U.S. PATENT DOCUMENTS 7,610,397 B2 10/2009 Gedik et al.
7,613,848 B2 11/2009 Amini et al.
7,644,110 B2 1/2010 Nishizawa et al.

(Continued)

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

(Continued)

*Primary Examiner* — Shyue Jiunn Hwa
(74) *Attorney, Agent, or Firm* — Scott A. Berger; James R. Nock

(57) ABSTRACT

Embodiments of the disclosure provide a method, system, and computer program product for managing a windowing operation. The method for grouping processing of a stream of tuples with each tuple containing one or more attributes can include receiving the stream of tuples to be processed by a plurality of processing elements operating on one or more computer processors. The method can also include processing, with a first processing method, a group of tuples from the stream of tuples into a grouping window. The method can also include processing, with a second processing method, a subgroup of tuples from the group of tuples into a subgrouping window. The second processing method can include identifying a sub-membership condition.

18 Claims, 8 Drawing Sheets

(56) References Cited

U.S. PATENT DOCUMENTS

| | | | |
|---|---|---|---|
| 7,834,875 B2* | 11/2010 | Liu | G06F 8/00 345/440 |
| 7,860,009 B2* | 12/2010 | Pike | H04L 47/10 370/235 |
| 8,032,554 B2 | 10/2011 | Nishizawa et al. | |
| 8,095,690 B2 | 1/2012 | Kashiyama et al. | |
| 8,122,006 B2 | 2/2012 | de Castro Alves et al. | |
| 8,180,801 B2 | 5/2012 | Zhang et al. | |
| 8,291,006 B2 | 10/2012 | Andrade et al. | |
| 9,183,107 B2* | 11/2015 | Branson | G06F 11/3048 |
| 2010/0293532 A1* | 11/2010 | Andrade | G06F 11/1438 717/140 |
| 2012/0218268 A1 | 8/2012 | Accola et al. | |
| 2013/0031124 A1 | 1/2013 | Santosuosso et al. | |

OTHER PUBLICATIONS

Jiang et al., "Estreams: Towards and Integrated Model for Event and Stream Processing", Technical Report CSE-2004-3, Jul. 2004, Department of Computer Science and Engineering, University of Texas at Arlington.

Li et al., "Semantics and Evaluation Techniques for Window Aggregates in Data Streams", SIGMOD '05: Proceedings of the 2005 ACM SIGMOD International Conference of Management of Data, Jun. 2005, pp. 311-322, ACM New York, NY, © 2005 DOI: 10.1145/1066157.1066193.

Patroumpas et al., "Subsuming Multiple Sliding Windows for Shared Stream Computation", ADBIS'11: Proceedings of the 15th International Conference on Advances in databases and Information Systems, Sep. 2011. http://www.dbnet.ece.ntua.gr/pubs/uploads/TR-2011-2.pdf.

Patroumpas et al., "Window Specification Over Data Streams", EDBT '06: Proceedings of the 2006 International Conference on Current Trends in Database Technology, pp. 445-464, Springer-Verlag Berlin, Heidelberg, © 2006.

Yong et al., "Mining Frequent Itemsets over Recent Data Stream Based on Genetic Algorithm", Bio-Inspired Computational Algorithms and Their Applications, Dr. Shangce Gao (Ed.), pp. 291-303, InTech, published online Mar. 7, 2012, published in print Mar. 2012. http://cdn.intechopen.com/pdfs/30239/InTech-Mining_frequent_itemsets_over_recent_data_stream_based_on_genetic_algorithm.pdf.

Branson et al., "Managing Multiple Windows on an Operator Graph", U.S. Appl. No. 14/036,581, filed Sep. 25, 2013.

* cited by examiner

MANAGING MULTIPLE WINDOWS ON AN OPERATOR GRAPH

CROSS-REFERENCE TO RELATED APPLICATIONS

This application is a continuation of co-pending U.S. patent application Ser. No. 14/036,581, filed Sep. 25, 2013. The aforementioned related patent application is herein incorporated by reference in its entirety.

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

The method for processing a stream of tuples with each tuple containing one or more attributes can include receiving the stream of tuples to be processed by a plurality of processing elements operating on one or more computer processors. The method can also include processing, with a first processing method, a group of tuples from the stream of tuples into a grouping window. The first processing method can include identifying a membership condition. The first processing method can also include determining whether the membership condition is met by a tuple from the stream of tuples. The first processing method can also include including the tuple in the grouping window in response to the membership condition being met. The method can also include processing, with a second processing method, a subgroup of tuples from the group of tuples into a subgrouping window. The second processing method can include identifying a sub-membership condition. The second processing method can include determining whether the sub-membership condition is met by a tuple from the group of tuples. The second processing method can also include including the tuple in the subgrouping window in response to the sub-membership condition being met.

Another embodiment is directed toward a computer program product for processing a stream of tuples with each tuple containing one or more attributes. The computer program product comprises a computer readable storage medium having program code embodied therewith, the program code comprising computer readable program code configured to process the attributes of the stream of tuples using stream operators operating on one or more computer processors and corresponding one or more processing elements. The computer readable program code can be configured to process, with a first processing method, a group of tuples from the stream of tuples into a grouping window. The first processing method is further configured to identify a membership condition. The first processing method can be configured to determine whether the membership condition is met by a tuple from the stream of tuples. The first processing method can be configured to include the tuple in the grouping window in response to the membership condition being met.

The computer readable program code can be configured to process, with a second processing method, a subgroup of tuples from the group of tuples into a subgrouping window. The second processing method can be configured to identify a sub-membership condition. The second processing method can be configured to determine whether the sub-membership condition is met by a tuple from the group of tuples. The second processing method can be configured to include the tuple in the subgrouping window in response to the sub-membership condition being met.

Another embodiment is directed toward a system for processing a stream of tuples.

BRIEF DESCRIPTION OF THE DRAWINGS

Like reference numbers and designations in the various drawings indicate like elements.

DETAILED DESCRIPTION

Figure 1:
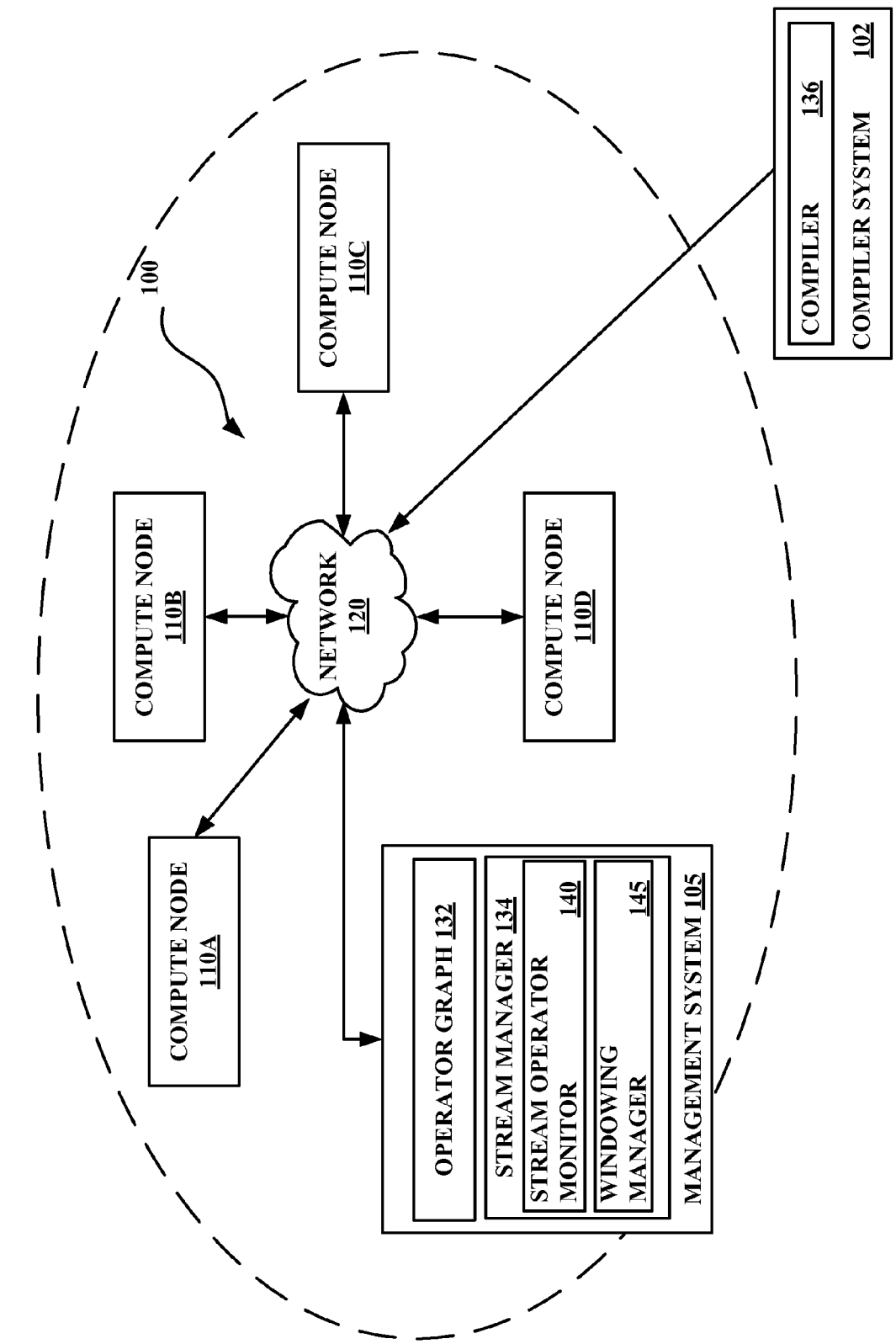
FIG. 1 illustrates a computing infrastructure configured to execute a stream computing application according to various embodiments.

Aspects of the present disclosure are generally directed to managing a grouping window and a subgrouping window using a stream operator. The stream operator can use separate processing methods for the grouping window and the subgrouping window. The subgrouping window can be excluded from the grouping window. Although not necessarily limited thereto, embodiments of the present disclosure can be appreciated in the context of streaming data and problems relating to indicative elements that process the stream of data. Throughout this disclosure, the term stream operator may be abbreviated "S.O."

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change a tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A stream computing application can process tuples from the stream of tuples within a grouping window using a processing method. The processing method can include the method of forming the grouping window with the stream of tuples. The grouping window can refer to a group of tuples that are analyzed together. Both the terms "grouping window" and "window" can be used interchangeably throughout this disclosure. The processing method can be a part of a windowing operation. For example, a windowing operation can use a count-based processing method to determine whether a stream of tuples falls within a grouping window.

The grouping window, or tuples that define the grouping window, can be defined further by a membership condition. The processing method can determine the membership condition used by the stream operator. For example, a time-based processing method can use a membership condition that involves time. The membership condition can identify conditions necessary to maintain membership in the grouping window. The membership condition can be further customized by a streaming application. In some embodiments, the membership condition can include a fixed amount of time, a count, or can be defined by attribute data within some relationship to other data, e.g., a spatial relationship. In streams computing, one type of spatial relationship can be done thru a windowing operation of a given stream operator. The window can be the same size as other windows within a stream of tuples or each window size can be variable. The membership condition can be described further herein.

A beginning, or start, and end of a grouping window in the windowing operation can be defined in a number of ways, e.g., the predetermined size of the grouping window, a period of time, a punctuation marker in the stream, or the attribute values for the tuples in a window. If the attribute values define the beginning and end of a grouping window, then the windowing operation can also be defined by a sentinel value. The windowing operation can therefore be referred to as a sentinel value-based windowing operation.

A sentinel value can generally be an indication of the beginning of a grouping window while a terminating sentinel value is generally an indication of the end of a grouping window. The sentinel value can be a particular attribute value. A stream operator can apply a grouping window in response to the sentinel value. For example, once the sentinel value is detected, a stream operator can implement a processing method that forms a grouping window.

A sentinel value can be defined by more than one attribute value. For example, a sentinel value can be defined by a particular tuple that includes both an attribute value of "Pine" for the attribute of "Tree" and an attribute value of "Mountain" for the attribute of "Location".

In various embodiments, a sentinel value can be defined by more than one attribute value in different tuples. For example, the sentinel value can be a triggering condition when the attribute value for the attribute "Tree" is "Juniper", then "Pine". A reading of a first tuple with the attribute value of "Juniper" and a second tuple with the attribute value of "Pine" can be the sentinel value.

A terminating sentinel value can be used to terminate the processing method and can be an attribute read from the stream of tuples. The terminating sentinel value can be the same or different than the sentinel value. If the sentinel value is the same as the terminating sentinel value, then the terminating sentinel value can be based on a function of the number of times the sentinel value appears. For example, if the sentinel value is a particular attribute value, then the terminating sentinel value can be 12 instances of the sentinel value. Embodiments of the disclosure can be directed toward a method to populate and trigger window operators using sentinel values contained in the tuples of a stream.

Each of the group of tuples from the grouping window can be further divided into a subgroup of tuples in a subgrouping window. The subgrouping window operates in a similar manner to the grouping window. The subgroup of tuples can be selected from the tuples identified in the grouping window. Each subgroup of tuples can be included in a subgrouping window using a submembership condition. The submembership condition can use the same processing method as the grouping window or a different processing method. For example, if the processing method for the grouping window is count-based, and membership condition for the grouping window is every 200 tuples, then a possible submembership condition could be every 25 tuples from the group of tuples defined by the grouping window, assuming that the processing method for the subgrouping window is also count-based. Another possible submembership condition can be a sentinel value that triggers within the grouping window. The both the membership condition and the submembership condition can either be met or unmet. If the membership or submembership condition is met by a tuple, then the tuple can be included in a grouping or subgrouping window.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 3:
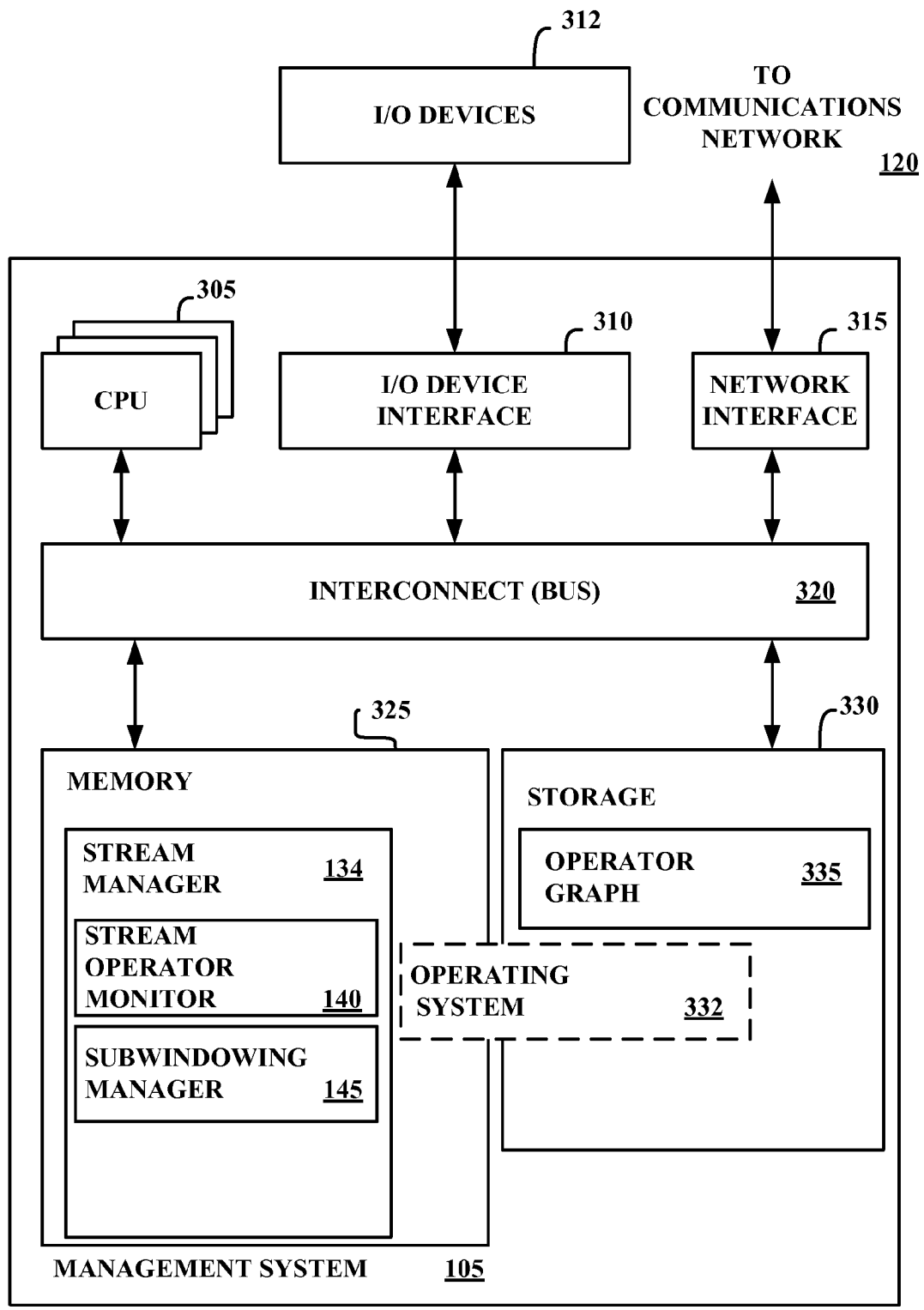
FIG. 3 illustrates a more detailed view of the management system of FIG. 1 according to various embodiments.

The management system 105 can control the management of the compute nodes 110A-110D (discussed further on FIG. 3). The management system 105 can have an operator graph 132 with one or more stream operators and a stream manager 134 to control the management of the stream of tuples in the operator graph 132. The stream manager 134 can have components such as a stream operator monitor 140 and a windowing manager 145. The stream operator monitor 140 can monitor the stream of tuples for compliance with a membership or submembership condition and communicate the presence or absence of the compliance with the membership or submembership condition to the stream manager 134, according to various embodiments. The windowing manager 145 can receive the compliance information from the stream operator monitor 140 and manage the initiation of the grouping window or subgrouping window.

In various embodiments, a stream operator can communicate with the stream operator monitor 140 that a membership condition has been fulfilled or not fulfilled. The stream operator monitor 140 can monitor the stream of tuples at one or more of the stream operators. Various embodiments of the disclosure can be directed toward specific types of stream operators, e.g., aggregate stream operators or counting stream operators. The stream operator monitor 140 can further communicate to the windowing manager 145 and request that the windowing manager 145 allow the stream operator to initiate a windowing operation.

In various embodiments, the stream operator can receive a signal to initiate or terminate a grouping or a subgrouping window using the processing method from the windowing manager 145. The stream operator can also be configured to initiate or terminate a grouping or subgrouping window in response to the membership condition alone.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
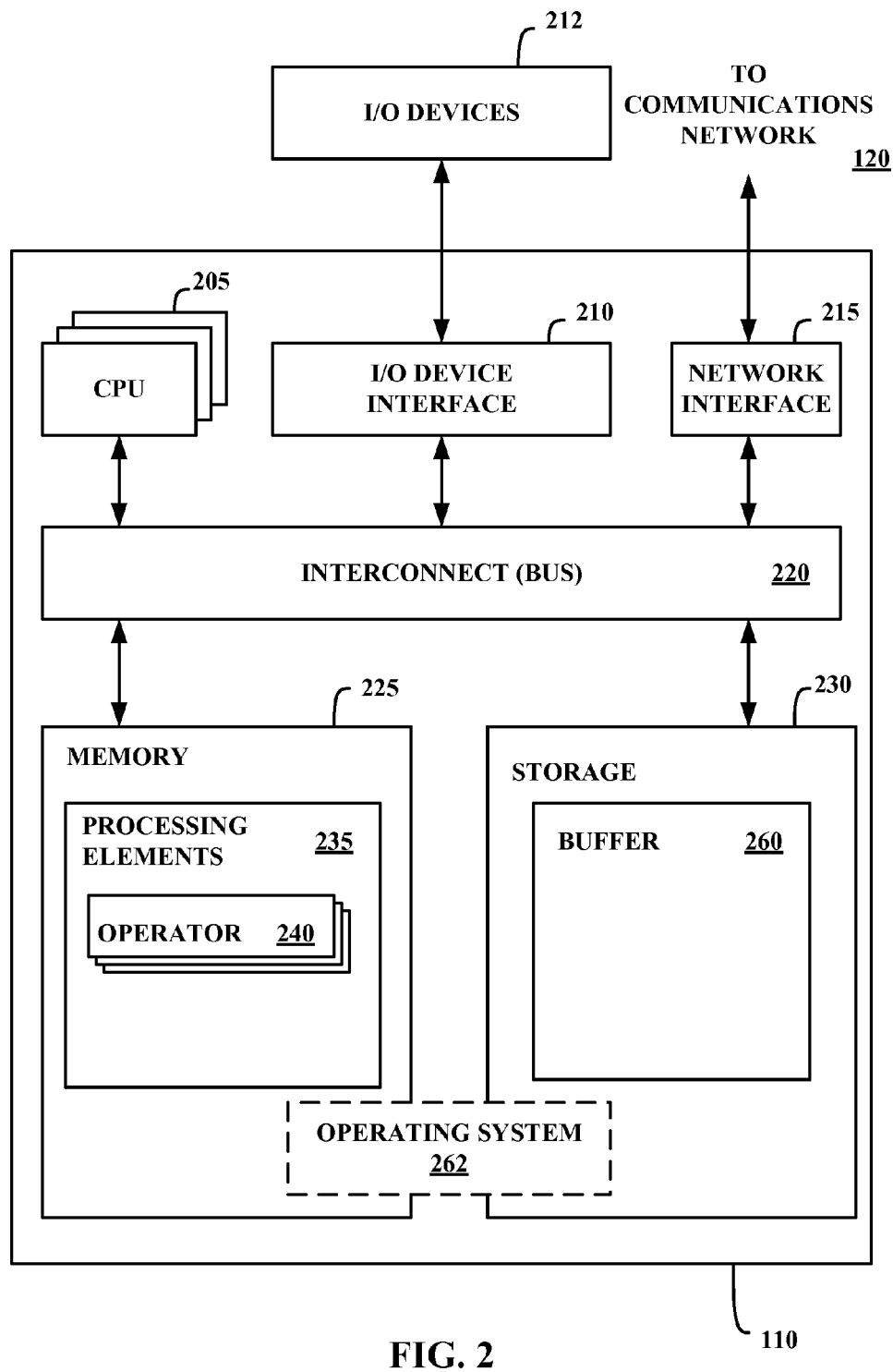
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that manage the windowing operation of a stream operator. In various embodiments, the stream manager 134 may have a stream operator monitor 140, and a windowing manager 145, discussed herein.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
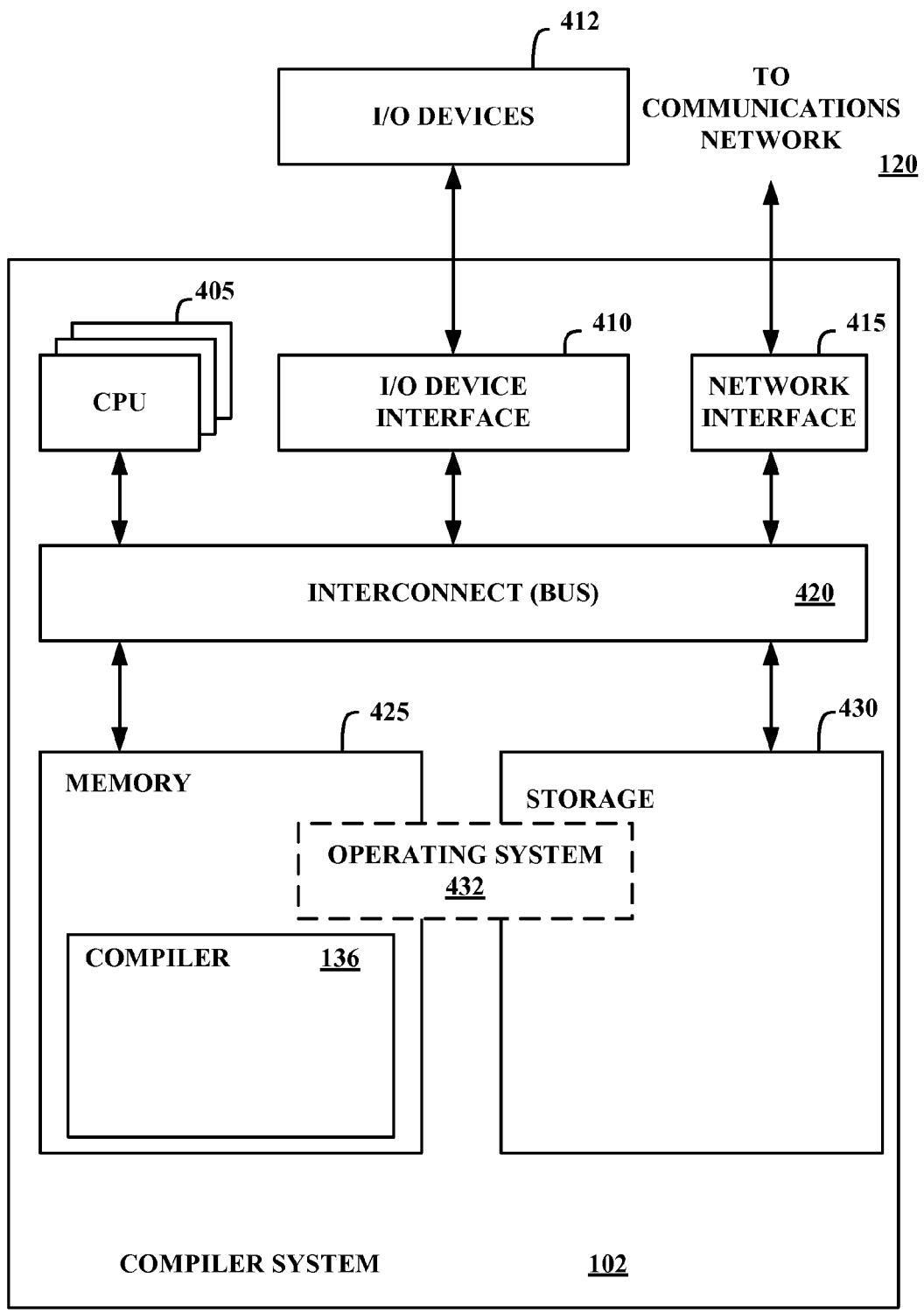
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

In various embodiments, the compiler 136 can include the various processing methods that are responsive to various membership or submembership conditions on a particular stream operator on the operator graph 335 when compiling the operator graph 335. In various embodiments, the processing method may be included as a default and activated from the stream manager 134. For example, a processing method that involves a count of tuples can be the default, while another processing method can be optional. The processing method may also be included as an optional feature for a particular stream operator and may be activated by the streaming application.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
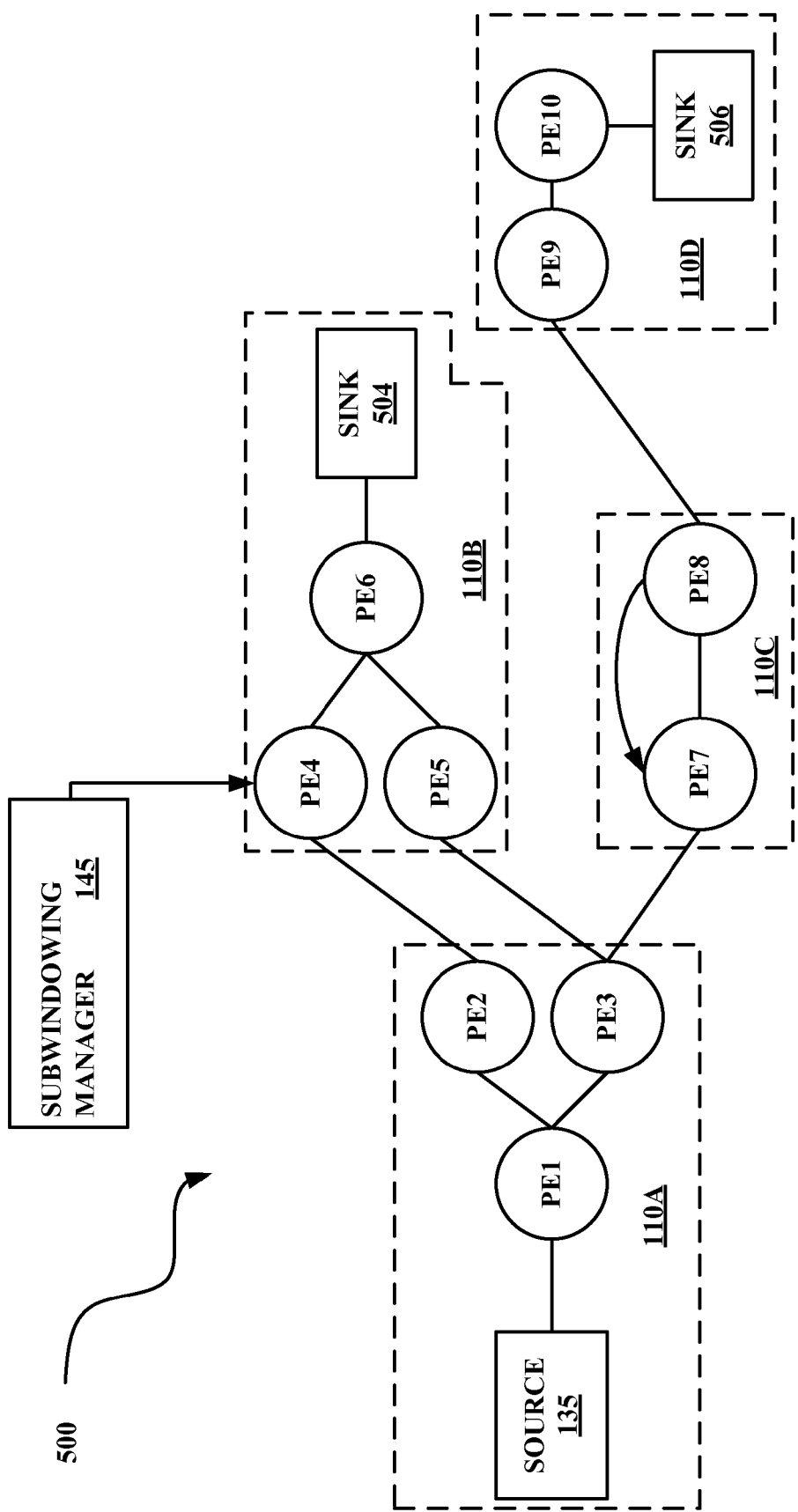
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

Each processing element may have a windowing manager 145. The processing element may further transmit or direct the stream operator to conduct a windowing operation within the processing element. The operator graph 132 can encompass one or more processing elements, e.g., PE2 and PE4 from FIG. 5, which may lie on more than one compute node, e.g., 110A and 110B.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
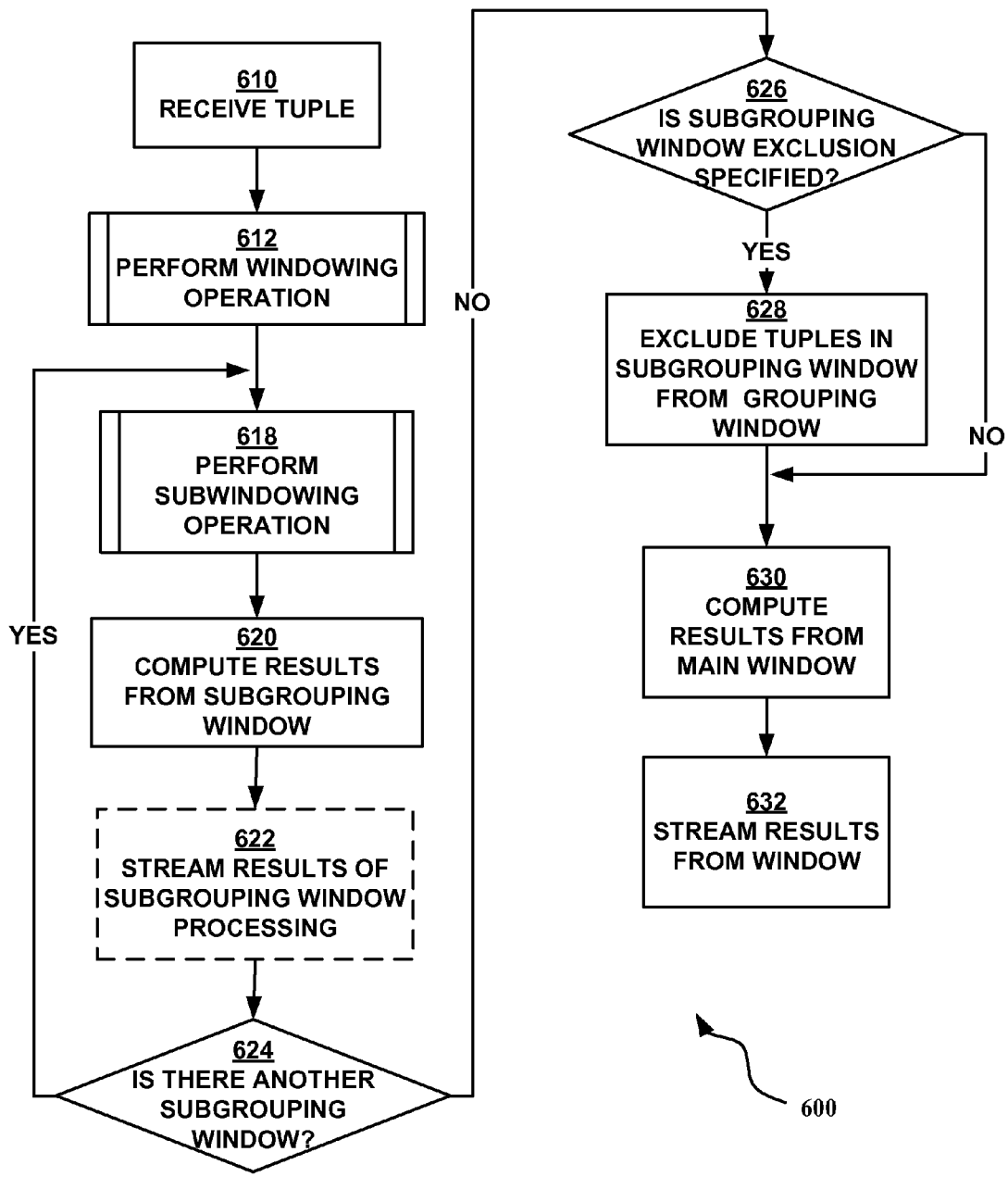
FIG. 6 illustrates a flowchart of a method for implementing a windowing operation based on a sentinel value, according to various embodiments.

FIG. 6 illustrates a flowchart of a method 600 for implementing a windowing operation and subwindowing operation, according to various embodiments.

The method 600 can begin at operation 610. In operation 610, a stream operator can receive a stream of tuples. When the stream operator receives a tuple, then the stream operator can include a time stamp to indicate when the tuple is received. After the tuple is received, then the method 600 can continue to operation 612.

In operation 612, the windowing manager 145 can perform a windowing operation using a processing method on the stream of tuples. As discussed herein, the windowing operation can determine the tuples in a grouping window and the processing method can determine the method that is used. The windowing operation can be defined by a processing method that is time-based. For example, the processing method can define a grouping window every 10 minutes. Operation 612 can be further discussed herein in FIG. 7. After the windowing operation is performed, then the method 600 can continue to operation 618.

In operation 618, a stream operator can perform a subwindowing operation. In the subwindowing operation, the stream of tuples from the grouping window can be further divided into one or more subwindows. The number of subwindows can be determined by the streaming application's preferences which can further be directed by a system administrator. The subwindowing operation in operation 618 that selects a subgrouping window from the grouping window can be similar to the windowing operation in operation 612.

The subwindowing operation can use separate processing methods from the windowing operation of operation 612. For example, the windowing operation can use a time-based processing method that includes a time limit of 10 minutes to define the grouping window. Assuming that the number of tuples within the 10 minute grouping window is 200 tuples, then the subswindowing operation can use a tuple count of every 10 tuples to define 20 subgrouping windows. In the above example, the stream operator can include any number up to 200 tuples in a subgrouping window. In another example, if the grouping window is a 10 minute interval, then the subgrouping window can also be the number of tuples within a 1 minute interval.

The subwindowing operation or the windowing operation can also include the use of sentinel values. A sentinel value can be an attribute value or range of attribute values of a tuple that cause the windowing manager to start the windowing operation. In various embodiments, the sentinel value can be a combination of two or more different attributes for a tuple. As discussed herein, the windowing operation can define a start and a stop of a group of tuples. The group of tuples can have the same calculations performed within the group. For example, if a stream operator performs an averaging calculation, then the stream operator can use the window of the stream of tuples to determine when the averaging starts and when the averaging stops in stream of tuples.

In various embodiments, the sentinel value can be included in the determination of a window. For example, if the windowing operation triggers on the attribute of "7", then the presence of "7" as read by the stream operator monitor 140 can trigger the windowing operation. The tuple with the attribute value of "7" can either begin the windowing operation once "7" is received or any number of tuples after. If the "7" is received, then the windowing manager 145 can start the windowing operation after four tuples from the sentinel value to create a buffer. Alternatively, the windowing manager 145 can start the windowing operation that includes the tuple with the sentinel value.

After the subwindowing operation is performed in operation 618, then the method 600 can continue to operation 620. In operation 620, the stream operator can compute results from the subgrouping window. In various embodiments, the computation can include performing calculations on the tuple from the subgrouping window that is defined in the subgrouping operation from operation 618. The computation can also involve various processing that can be separate from the processing method described herein. For example, the stream operator can perform an aggregation operation, a counting operation, a searching operation, a comparing operation, or an adding operation to the subgrouping window. In various embodiments, the streaming operator can divert the tuples from the subgrouping window to another streaming operator that computes the results. After the computation is performed, then the method 600 can continue to operation 622.

In operation 622, the stream operator can stream the results of the computation to a stream operator. In various embodiments, operation 622 can be an optional step which can depend on whether another stream operator receives the computation results from the subgrouping window. It can also be possible for the same stream operator that performs the subwindowing and windowing operation to use the computation results from the subgrouping window.

In one example, a tollbooth can use the license plate of a person of interest car as a sentinel value to initiate the grouping window. The processing of the grouping window can record images of every driver following the person of interest car. The subgrouping window can include all the recorded images within 5 minutes of the person of interest car. A saving operation can occur with the subgrouping window, which can be equivalent to the compute results in operation 620. In various embodiments, the saving operation can stream the tuples from the subgrouping window to another stream operator or a database. After the processing results from the subgrouping window are streamed to a stream operator, then the method 600 can continue to operation 624.

In operation 624, the stream operator can determine whether there is another subgrouping window. Another subgrouping window may exist for the grouping window determined in operation 612. In various embodiments, the subgrouping window can be for a separate grouping window made at a different time. If there is another subgrouping window, then the method 600 can continue to operation 618 where the subwindowing operation occurs. If there is not another subgrouping window, then the method 600 can continue to operation 626.

In operation 626, the stream operator can determine whether there is subgrouping window exclusion specified. If there is no exclusion for the subgrouping window specified, then the method can continue to operation 630. If there is an exclusion for the subgrouping window, then the method 600 can continue to operation 628.

In operation 628, the stream operator can exclude the tuples that fall outside of the particular subgrouping window or subgrouping windows. In various embodiments, the tuples for a subgrouping window can be excluded from the overall processing according to various embodiments. For example, if the grouping window is defined by the first 5 minutes, and the subgrouping window is defined by every 1 minute, and the stream operator performs a counting function, then the tuple count for the first grouping window could be 15 and the subgrouping window tuple count could be 3. In this example, if the subgrouping window tuple count is excluded, then the stream operator can count tuples for the first grouping window that exclude the tuples belonging to the subgrouping window, i.e., 12 tuples.

To illustrate the concept of subwindow exclusion, the tollbooth example used herein can be applied. In the tollbooth example, the grouping window can be defined by the presence of a person of interest car and the subgrouping window can be defined by every 5 minutes from the presence of the person of interest car. Thus, the subgrouping window exclusion excludes every subgrouping window except for the first subgrouping window. The excluded tuples can be discarded or diverted to an alternate processing.

In operation 630, the results from the grouping window can be processed. For example, if the grouping window is defined by every 1000 tuples and stream operator aggregates all of the values in the grouping window, then the exclusion of the first 100 tuples in a subgrouping window can result in the aggregation of the first 900 tuples after the 100 tuples. If the value was determined from operation 630, then the value can be reprocessed with the exclusion of the subgrouping window. After the results for the grouping window are computed, then the method can continue to operation 632. In operation 632, the results can be streamed to another stream operator according to the streaming application preferences.

Figure 7:
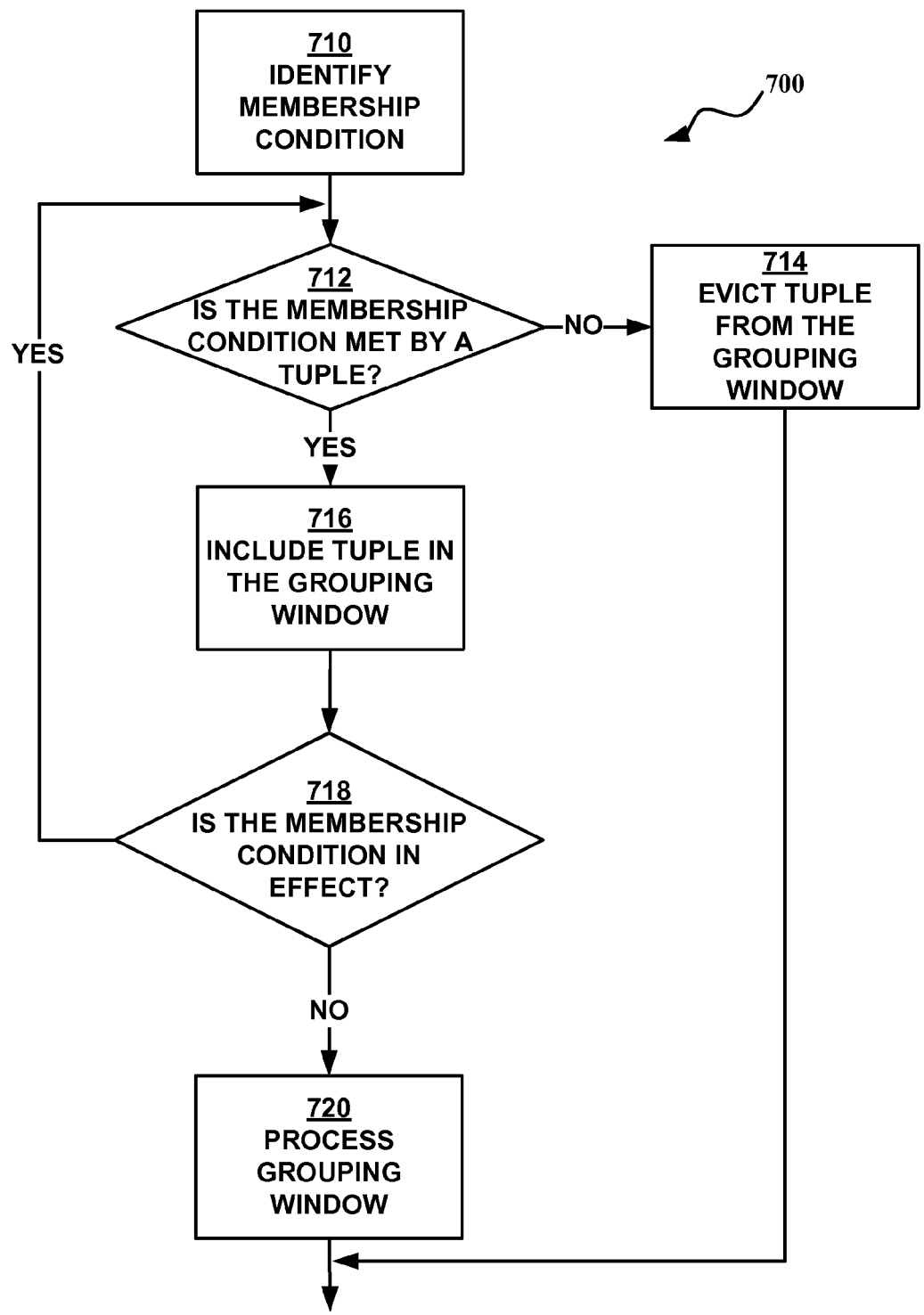
FIG. 7 illustrates a flowchart of a method of determining a sentinel value, according to various embodiments.

FIG. 7 illustrates a method 700 of performing a windowing operation, according to various embodiments. The method 700 can correspond to operation 612 from FIG. 6. The method 700 can also apply similarly to subgrouping windows from operation 618. The method 700 can begin at operation 710.

In operation 710, the membership condition maybe identified by the stream operator. The membership condition can define when a windowing operation begins and ends. Examples of different types of windowing operations include time-based, count-based, or windowing operations based on attribute values of a tuple. The membership condition can depend on the windowing operation performed. For example, if the windowing operation is time-based, then the membership condition can be a particular timestamp within a time range defined by the stream operator. If the windowing operation is count-based, then the membership condition can be a count within the counting range defined by the stream operator. After the membership condition is identified, then the method 700 can continue to operation 712.

In operation 712, the stream operator can determine whether the membership condition is met by the tuple. For example, if the windowing operation is based on an attribute value, the stream operator can measure the presence of a sentinel value. If the membership condition is not met by a tuple, then the method 700 can continue to operation 714. If the membership condition is met by the tuple, then the method can continue to operation 716.

In operation 714, the stream operator can evict the tuple from the grouping window. A tuple can be evicted from the grouping window when the tuple no longer meets the membership condition. For example, if there is a time delay between the time stamp when the tuple is transmitted, and when the tuple is received by the stream operator, then the tuple can have a timing error.

Timing errors can occur when a stream operator receives a first tuple after a second tuple. For example, a first tuple that was sent from a stream operator may receive a time stamp of 1200 while a second tuple that was sent from the stream operator may receive a time stamp of 1202. The first tuple may be received by another stream operator at 1220 while the second tuple may be received by another stream operator at 1215. Receiving the first tuple later than the second tuple due to network or processing latency between the stream operators may cause the first tuple to be delayed.

The stream operator monitor 134 can monitor the time stamp for the stream of tuples to determine whether a timing error exists. If the timing error is detected, then the stream manager 134 can determine whether to discard a tuple to correct the timing error based on the application parameters. In various embodiments, the tolerance level for late data can be adjusted. In various embodiments, the tolerance level can be a buffer to hold a certain number of tuples in order to rearrange the receipt of the tuples. The tolerance level can also refer to a time-based tolerance level where the timing error can be corrected to values within the tolerance level.

Continuing the example mentioned herein, if the tolerance level is 5 minutes, then every tuple received in the last 5 minutes can be retained in a buffer. If the second tuple used in the previous example is received at 1215, and the first tuple is received at 1220, then the first tuple is within the 5 minute tolerance level. However, if the first tuple is received at 1221, then the first tuple would not be within the 5 minute tolerance level. Assuming that the first tuple is within the tolerance level, the stream manager 134 can take the first tuple and adjust the order of the stream to ensure that the first tuple is ordered before the second tuple.

Thus, a tuple that is received later can be evicted from the grouping window. The evicted tuple can be a part of another grouping window or can be discarded according to the stream application's preferences.

In operation 716, the stream operator can include the tuple in the grouping window once the membership condition is met. Once the tuple is included in the grouping window, then the method can continue to operation 718. In operation 718, subsequent tuples can be included in the grouping window until the membership condition is no longer met. For example, if the windowing operation uses a 5 minute interval, then tuples with a timestamp ranging from 04:00:01 to 04:05:00 can be in the first grouping window. The second grouping window can be defined by tuples with a timestamp ranging from 04:05:01 to 04:10:00. Therefore, the second grouping window can have a different membership condition. If the membership condition is still in effect, then the stream operator can continue to group tuples and continue to operation 712. If the membership condition is no longer in effect, then the method 700 can continue to operation 720.

In operation 720, the tuples in the grouping window are processed by the stream operator. In various embodiments, the stream operator can cache the tuples or send the tuples within the grouping window to another stream operator for later access. During subsequent processing, the stream operator can also access the cache that holds the tuples from the grouping window. In various embodiments, the stream operator can divert the tuples in the grouping window to another stream operator for processing.

Figure 8:
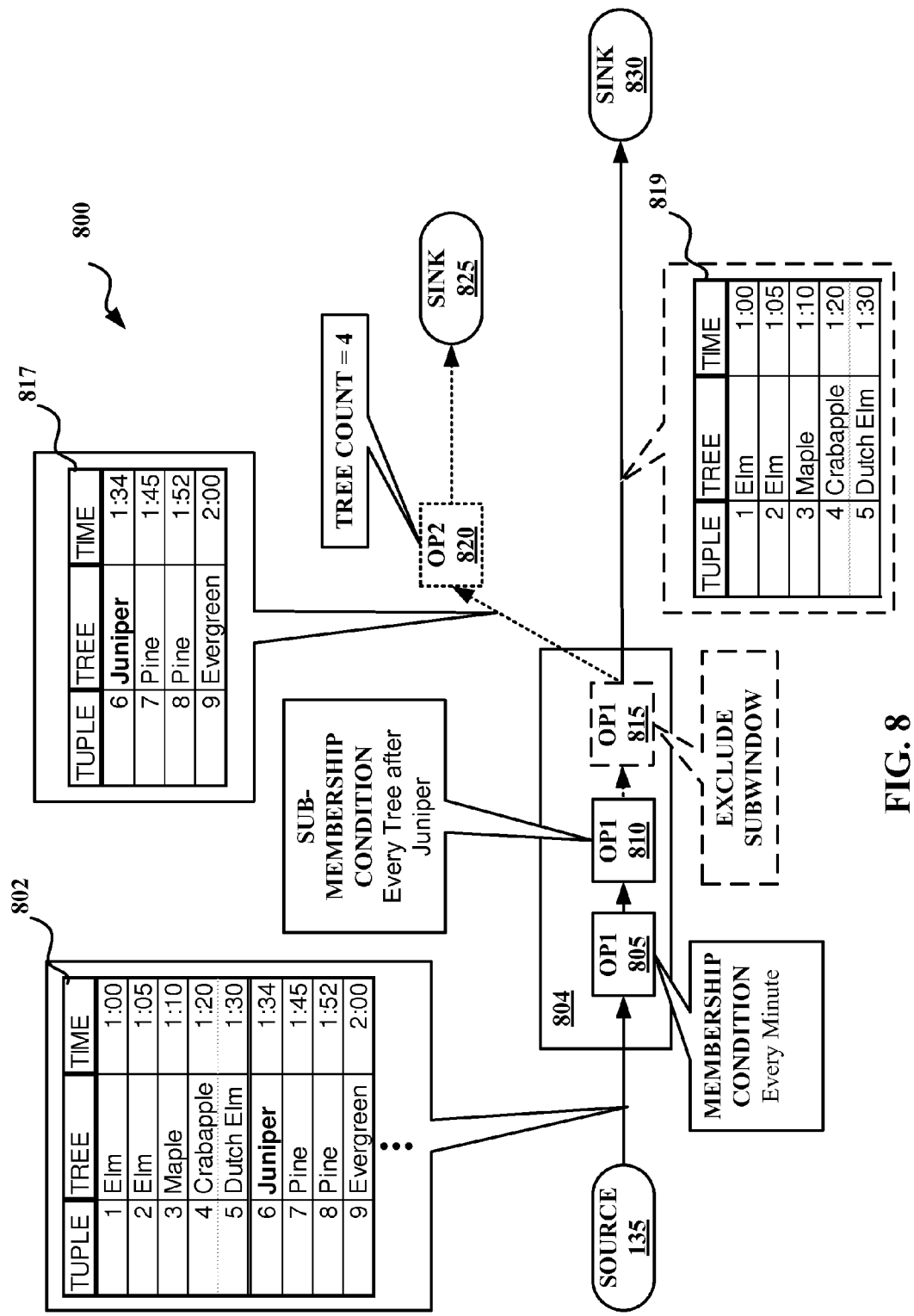
FIG. 8 illustrates a block diagram of an operator graph that implements a windowing operation in response to a sentinel value, according to various embodiments.

FIG. 8 illustrates an operator graph 800 that is configured to perform a windowing and subwindowing operation, according to various embodiments. The operator graph 800 can receive a stream of tuples from a source 135 and output the stream of tuples to a sink 825 and sink 830. In the following operator graph 800, the received tuples 802 are received by stream operator 804. As an example, the operator graph 800 can operate in the context of a forestry survey with types of trees as a measurement. In this example, the grouping window can be time-based and the subgrouping window can be based on a sentinel value of a type of tree that corresponds to a particular ecosystem. The operator graph 800 can illustrate concepts contained herein.

Stream operator 804 can include three separate modules that perform different functions: a windowing module 805, a subwindowing module 810, and a subwindow exclusion module 815. The windowing module 805 can monitor the received tuples 802 for the membership condition. In this example, the grouping window is time-based, therefore the membership condition in this instance can be a time period of one minute. The windowing module can be configured to perform the steps found in operation 610 and 612 from FIG. 6. The windowing module 805 can output the tuples from the grouping window to a subwindowing module 810.

The subwindowing module 810 can receive the tuples within the grouping window from the windowing module 805. The subwindowing module 810 can be configured to perform the steps in operation 618 and 620 from FIG. 6. The subwindowing module 810 can employ a sub-membership condition. The sub-membership condition functions in a similar manner to the membership condition. The stream operator can monitor the tuples in the grouping window for the sub-membership condition to determine if the tuple belongs in the subgrouping window. In the operator graph 800, the sub-membership condition is to select every tree after the sentinel value of "Juniper". Therefore, after the value "Juniper" is detected, the subgrouping window can be defined until the end of the grouping window, which, in this example, is at time=2:00. The subwindowing module can transmit the tuples from the subwindow to the subwindow exclusion module 815.

In the subwindow exclusion module 815, the tuples from the subgrouping window can be excluded from the grouping window. The exclusion can occur in a similar manner to operation 626 and 628 from FIG. 6. In the forestry survey example, the subwindow exclusion module 815 can exclude the subgrouping window from the grouping window. The subwindow exclusion module 815 can also route the excluded subgrouping window to another stream operator, e.g., stream operator 820.

The subwindow exclusion module 815 can further route the tuples in the subgrouping window, e.g., table 817, to stream operator 820. Stream operator 820 can perform further processing methods such as a counting operation or an aggregation operation. In the operator graph 800, the stream operator 820 is shown performing a counting operation that counts the number of trees. In various embodiments, the subgrouping window can also be deleted by the operator graph 800 or the processing can be skipped. The stream operator 820 can output to the sink 825.

Stream operator 804 can be configured to output the grouping window to the sink 830. The stream operator 804 can be configured to output the entire grouping window or a partial grouping window. In the forestry survey example, the operator graph 800 shows a table of tuples 819 from grouping window with the subgrouping window removed. The tuples 819 can be further processed by subsequent stream operators.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A computer program product for processing a stream of tuples, each tuple containing one or more attributes, the computer program product comprising a computer readable storage medium having program code embodied therewith, the program code comprising computer readable program code configured to:
   process the attributes of the stream of tuples using stream operators operating on one or more computer processors and corresponding one or more processing elements;
   process, with a first processing method, a group of tuples from the stream of tuples into a grouping window, wherein the first processing method is configured to:
   identify a membership condition,
   determine whether the membership condition is met by a tuple from the stream of tuples,
   evict the tuple from the grouping window in response to the membership condition being unmet, and
   include the tuple in the grouping window in response to the membership condition being met; and
   process, with a second processing method, a subgroup of tuples from the group of tuples into a subgrouping window, wherein the second processing method is configured to:
   identify a sub-membership condition,
   determine whether the sub-membership condition is met by a tuple from the group of tuples, wherein the membership condition and the sub-membership condition are not the same condition type, and
   include the tuple in the subgrouping window in response to the sub-membership condition being met.

2. The computer program product of claim 1, wherein the computer readable program code is further configured to:

remove the subgroup of tuples from the group of tuples; and process the group of tuples without the subgroup of tuples.

3. The computer program product of claim 1, wherein identify the membership condition includes:
  select a time-based windowing operation; and
  identify a time for the membership condition.

4. The computer program product of claim 1, wherein identify the membership condition includes:
  select a tuple count-based windowing operation; and
  identify a tuple count for the membership condition.

5. The computer program product system of claim 1, wherein identify the membership condition includes:
  select a sentinel value-based windowing operation; and
  identify a sentinel value for the membership condition.

6. The computer program product of claim 1, wherein the process a subgroup of tuples includes:
  evict the tuple from the grouping window in response to the membership condition being unmet.

7. A system for processing a stream of tuples, each tuple having one or more attributes, comprising:
  one or more processing elements operating on one or more computer processors configured to processes the attributes from the stream of tuples, each processing element configured to:
  process the attributes of the stream of tuples using stream operators operating on one or more computer processors and corresponding one or more processing elements;
  process, with a first processing method, a group of tuples from the stream of tuples into a grouping window, wherein the first processing method is configured to cause the system to:
    identify a membership condition,
    determine whether the membership condition is met by a tuple from the stream of tuples,
    evict the tuple from the grouping window in response to the membership condition being unmet, and
    include the tuple in the grouping window in response to the membership condition being met, and
  process, with a second processing method, a subgroup of tuples from the group of tuples into a subgrouping window, wherein the second processing method is configured to cause the system to:
    identify a sub-membership condition,
    determine whether the sub-membership condition is met by a tuple from the group of tuples, wherein the membership condition and the sub-membership condition are not the same condition type, and
    include the tuple in the subgrouping window in response to the sub-membership condition being met.

8. The system of claim 7, wherein each processing element is further configured to:
  remove the subgroup of tuples from the group of tuples; and
  process the group of tuples without the subgroup of tuples.

9. The system of claim 7, wherein identify the membership condition includes:
  select a time-based windowing operation; and
  identify a time for the membership condition.

10. The system of claim 7, wherein identify the membership condition includes:
  select a tuple count-based windowing operation; and
  identify a tuple count for the membership condition.

11. The system of claim 7, wherein identify the membership condition includes:
  select a sentinel value-based windowing operation; and
  identify a sentinel value for the membership condition.

12. The system of claim 11, wherein the sentinel value is a combination of two or more different attributes.

13. The system of claim 11, wherein identify the sentinel value includes identify a tuple with the sentinel value.

14. The system of claim 7, wherein the process the subgroup of tuples includes:
  evict the tuple from the grouping window in response to the membership condition being unmet.

15. The system of claim 7, wherein the one or more processing elements are configured to:
  process, with a third processing method, a second subgroup of tuples from the group of tuples into a second subgrouping window, wherein the third processing method includes:
    identify a second sub-membership condition,
    determine whether the second sub-membership condition is met by a tuple from the group of tuples and from the subgroup of tuples, and
    include the tuple in the second subgrouping window in response to the second sub-membership condition being met.

16. The system of claim 7, wherein the one or more processing elements are configured to determine whether the sub-membership condition is met by a tuple from the group of tuples by determining whether there is a sub-grouping window exclusion specified for the tuple.

17. The system of claim 7, wherein the one or more processing elements are configured to evict in response to a timing error, wherein the timing error occurs when there is a time delay between a first time stamp when a first tuple from the stream of tuples is transmitted, and a second time stamp when the first tuple is received.

18. The system of claim 17, wherein the timing error has a tolerance level that is adjustable, wherein the tolerance level is a buffer to hold a certain number of tuples in order to rearrange the receipt of tuples.

* * * * *